United States Patent [19]
Ochel et al.

[11] 3,764,913
[45] Oct. 9, 1973

[54] DIGITAL SYNCHRONOUS FM-MODEM

[75] Inventors: Günter Ochel; Jürgen Schröder, both of Bremen, Germany

[73] Assignee: U. S. Philips Corporation, New York, N.Y.

[22] Filed: Feb. 8, 1972

[21] Appl. No.: 224,499

[30] Foreign Application Priority Data
Feb. 10, 1971 Germany .................. P 21 06 172.3

[52] U.S. Cl. .................. 325/30, 178/66 R, 325/15, 325/17
[51] Int. Cl. .................. H04b 1/40
[58] Field of Search .................. 178/66 R; 325/15, 325/17, 18, 19, 30

[56] References Cited
UNITED STATES PATENTS
3,665,103 5/1972 Watkins .................. 178/66 R

*Primary Examiner*—Charles E. Atkinson
*Assistant Examiner*—R. Stephen Dildine, Jr.
*Attorney*—Frank R. Trifari

[57] ABSTRACT

A digital synchronous modem for the synchronous FM transmission of binary coded data signal through cables and internal telephone lines where both a modulator in a transmitter section and a demodulator in a receiver section are controlled by a main generator providing a fundamental frequency that is divided down to a clock frequency by a stepwise controllable digital divider. The divider synchronizes the receiver to the rythmn of received data signals by altering its division ratio in response to a control signal derived by comparing the zero crossings of the received data signal to the clock pulses.

9 Claims, 15 Drawing Figures

PATENTED OCT 9 1973 3,764,913

SHEET 01 OF 10

DIGITAL SYNCHRONOUS FM-MODEM

The invention relates to a digital synchronous modem whose transmitter section includes a modulator and whose receiver section includes a demodulator for the synchronous FM-transmission of binary coded data signals through internal telephony lines or local cables at stepwise adjustable transmission speeds.

For the transmission of binary coded information through telephony communication systems "modems" (modulator-demodulator circuits) are used which modulate the binary data signal in such a manner that the transmitted signal is optimally matched to the characteristics of the transmission channel as regards frequency and phase. A bandwidth of approximately 3.1 kHz is available when using the common telephony channels. As a result of the properties of channel filters in carrier frequency transmission systems the actual useful bandwidth is, however, reduced on the one hand by an unfavourable amplitude characteristic and on the other hand by a strong non-linearity of the phase characteristic particularly in the neighbourhood of the band limits. An increase in the transmission speed (for example, to values of more than 1,200 bits/s) can therefore only be achieved at very high cost both at the transmitter and at the receiver end. Consequently special modulation techniques are used. For optimum use of the available bandwidth the transmission spectrum must be limited accordingly, for example, by means of single sideband transmission. Most of these methods require a coherent demodulation at the receiver end, that is to say, the received signals must be brought back to the base band by means of a signal corresponding to the carrier as regards frequency and phase. The carrier is to be recovered from the received spectrum in case of vestigial sideband transmission or from the pilot signals added at the transmitter end in case of single side band transmission.

The use of data-processing arrangements in the economic and administrative fields has made "in-plant" data transmission, that is data transmission through internal or local lines, increasingly important. This is caused particularly by the use of many data terminals in a relatively small area (for example, plant, building, branch). These transmission lines are generally fixed interconnected telephony communication lines which are used for data transmission only and which are galvanically arranged to multipoint networks. The bandwidth required for data transmission through these inplant line networks is not limited by filters. Transmission properties are exclusively determined by the characteristic properties of the cables used, so in contrast with the telephony communication lines of the public telephone network. The phase characteristic of a number of lines has in fact a strong non-linearity in the neighborhood of the frequency of 0 Hz and for this reason it is essential to modulate the data signal so as to exclude spectral components in this frequency range and thereby to prevent signal distortion from occurring. The use of conventional modems having a comparatively high transmission speed and being used for bridging large distances in the public telephone network, is not justified in these cases.

Relatively short communication lines facilitate the transmission of data signals in the base band as well. An arrangement for the transmission of data signals is known which operates in accordance with the double current principle commonly used in telegraphy techniques and which, unlike the transmission speeds obtained in the telex technique, makes possible the transmission of data signals to several kbit/s.

Modern data input and output terminals operate at increasing transmission speeds which makes a syhchronous data transmission efficient. This synchronous data transmission requires additional circuits in the data transmission arrangement so as to ensure synchronization between transmitter and receiver. In asynchronous modems and in the above-mentioned direct current transmission arrangement, in which synchronization signals for the data receiver clock pulse generator cannot be dreived from pilot signals added to the transmitter spectrum or from the transmitter spectrum itself, but must be derived from the zero crossings of the demodulated data signal in asynchronous modems or from the zero crossings of the received data signal in case of direct current transmission systems, the synchronization of the data clock pulse generator requires prescribed synchronizing characters. In addition, the low transmitter impedance of the direct current transmission system prohibits coupling various transmitters to one transmitter line.

Furthermore modems are known, which employ the method of coherent FM-transmission and are also largely composed of digital circuits. In transmitting bit synchronous data signals special synchronizing circuits are required for the transmitter section and the receiver section of the modem so as to keep the modulated signal to be applied to the transmission line or the demodulated signal at the receiver end in synchronism with a prescribed data clock pulse signal. In this case the data transmitter clock pulse signal determining the transmission speed (bit-frequency) and phase position may be generated in the modem itself, but alternatively, this data transmitter clock pulse signal may be applied to the modem by the data-processing arrangement. Dependent on the use of the modem, it must have different synchronizing circuits.

Independent of their use, the syhchronous modems known hitherto include the circuits required for generating the synchronizing signals in the most unfavourable case. This fact implies that the cost of these circuits are too high for many applications of these modems and that the equipment is therefore not utilized economically.

These drawbacks are obviated by the digital synchronous modem according to the invention, in that the transmitter section includes a main generator for generating a fundamental frequency from which clock pulses are derived by means of a stepwise controlled frequency divider, said clock pulses controlling the modulator and demodulator both consisting of logical gate circuits and bistable triggers, said clock pulses being applied to a phase detector to which also the zero crossings of the received data signals are applied, said phase detector applying a control signal to the stepwise controlled frequency divider for synchronizing the clock pulses with the said zero crossings, said clock pulses also being applied to a stepwise adjustable clock frequency divider which provides a data received clock pulse signal determining the data transmission speed.

One embodiment of the modem according to the invention which may be advantageously used for controlling the transmitter section by means of an external data transmitter clock pulse signal is characterized in that the main generator in the transmitter section is connected to a second stepwise controlled frequency divider for generating clock pulses controlling the modulator, which clock pulses are applied to a second phase detector to which also an external data transmitter clock pulse signal is applied, said second phase detector applying a control signal to the second stepwise controlled frequency divider for synchronizing the clock pulses for te modulator with said external data transmitter clock pulse signal.

A further embodiment of the modem according to the invention which may be advantageously used for generating a data transmitter clock pulse signal in the modem itself is characterized in that the main generator in the transmitter section is connected to an additional fixed frequency divider for generating clock pulses controlling the modulator. A stepwise adjustable clock frequency divider is connected to said fixed frequency divider. The adjustable clock frequency divider provides a data transmitter clock pulse signal corresponding to the desired data transmission speed and is independent of the said data receiver clock pulse signal.

Basically, the modem may be operated at any transmission speed to be used for data transmission because exclusively digital circuits are used for the realization of the modulation and demodulation process and because the transmission speed may be varied not only by the choice of a given division ratio of the digital frequency divider, but also by the choice of the frequency of the main generator.

The advantage of the synchronous modem according to the invention resides in the fact that an optimum adaptation to the various applications can be obtained by means of only a simple digitally operating additional synchronizing circuit or by means of an additional clock frequency divider. Furthermore, the coupling of many modems and hence many data terminals to a common telephony line (multidrop arrangement) is possible.

Due to the synchronous data transmission and the simple choice of the frequencies representing the characteristic states of the data signal, a simple coherent demodulation is possible in the receiver section of the modem. Recovery of the synchronous control clock pulse signal required for demodulation, and of the data receiver clock pulse signal derived therefrom, can be realized at low cost. Synchronization of the data clock pulse generator requires no transmission of special synchronizing characters. The data to be transmitted may be called from the data source by means of a data transmitter clock pulse signal generated in the modem. In addition, there is the possibility of external synchronization of the transmitter section by means of an external data transmitter clock pulse signal which is applied to the modem together with the data signal from the data source.

In order that the invention may be readily carried into effect, some embodiments thereof will now be described in detail by way of example, with reference to the accompanying diagrammatic drawings in which FIG. 1 shows an embodiment of a digital FM-modulator while FIG. 2 shows the associated pulse diagrams;

FIG. 3 shows an embodiment of a digital FM-demodulator while

FIG. 5 shows an embodiment of the digital receiver section of the modem according to he invention while

Figure 1:
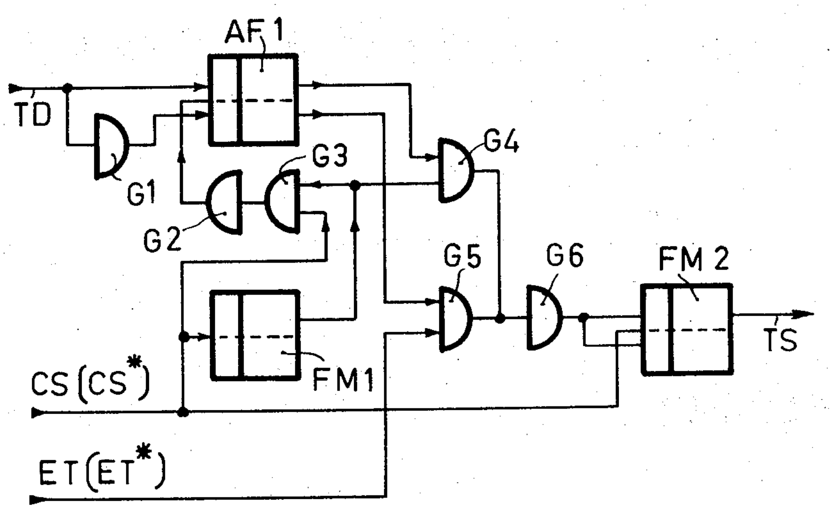

In practice three different cases with reference to the data transmitter clock pulse signal used may be distinguished:

a. First method

The transmitter and receiver sections operate with only one data clock pulse signal ST, namely the data receiver clock pulse signal RST which is generated in the same way by means of the same unit in all versions of the modem. This simplest embodiment of the modem is used in combination with data processing arrangements which transmit or receive synchronous data signals in accordance with the "slave" method.

b. Second method

The transmitter section and the receiver section operate with data clock pulse signals independent of each other. The data receiver clock pulse signal RST is generated in the modem and is synchronized with the zero crossings of the received modulated data signal RS. The data transmitter clock pulse signal TST is applied to the modem by the data-processing arrangement. In the modem itself, a synchronization of the signals to be transmitted is effected by means of the data transmitter clock pulse signal TST provided by the data-processing arrangement.

c. Third method

The data transmitter clock pulse signal TST and the data receiver clock pulse signal RST are independent of each other, as in the version described under item *b*). In contrast therewith, however, the data signals to be transmitted are called up from the data-processing device by means of the data transmitter clock pulse signal TST internally generated in the modem. The data receiver clock pulse signal RST is generated in the same way as described under items a) and b). This version may be used in the line control unit of a computer which applies the data signals to a data transmission system or derives the signals therefrom.

The modulation methods will be described hereinafter with reference to the modulator circuit; the demodulation method will be described with reference to the demodulator circuit and the generation of the data clock pulse signals which are synchronous with the data signal will be described as well.

The modulation method used in binary frequency modulation (Frequency Shift Keying) with continuous phase. Characteristic frequencies $f_1$ and $f_2$ are alloted to the two possible states of the modulating data signal, the high characteristic frequency $f_1$ representing the binary value "0" and th low characteristic frequency $f_2$ representing the binary value "1" of the data signal.

To obtain a simple demodulation of the received modulated data signal RS, a transition between the separate characteristic frequencies $f_1$ and $f_2$ in dependence on a data signal transition between the binary values "0" and "1" is only performed at a phase of 0° or 180° of the characteristic frequencies.

To satisfy this requirement certain conditions concerning the numerical ratio between the characteristic frequencies $f_1$ and $f_2$ relative to each other and relative to the characteristic value of the bit interval T at the highest transmission speed $vu$ are to be fulfilled:

1. $f_1T = m$ where $m = 1, 2, 3, \ldots$ and $T = 1/vu$
2. $f_2T = n$
3. $f_1/f_2 = m/n = p$ where $p = 2, 3, 4, \ldots$ In connection with the demodulation method described hereinafter and the required recovery of a synchronous clock pulse signal CS of frequency $f_s$ from the zero crossings of the received modulated data signal RS, the ratio $f_1/f_2 = p$ is equal to an even number; in the relevant case $p$ is chosen to be 2. When one signal period of the high characteristic frequency $f_1$ occurs per bit interval $T$ ($m = 1$), the value of 0.5 is found for $Tf_2 = n$, thus half a signal period of the low frequency $f_2$ occurs per bit interval $T$.

For the above-mentioned values the following values for $f_1$, $f_2$ and $f_s$ are found at a value of $vu$ = 9,600 bits/s: $f_1$ = 9.6 kHz, $f_2$ = 4.8 kHz and $f_s$ = 19.2 kHz.

The two characteristic frequencies $f_1$ and $f_2$ and all frequencies used for the practical realization of the modem according to the invention are derived from a frequency $f_0$ (for example, $f_0$ = 614.4 kHz) of the main generator by means of binary frequency divider stages so that a rigid phase coupling of the signals having frequencies $f_1$ and $f_2$ are representing the characteristic states of the data signal is ensured.

Figure 2:
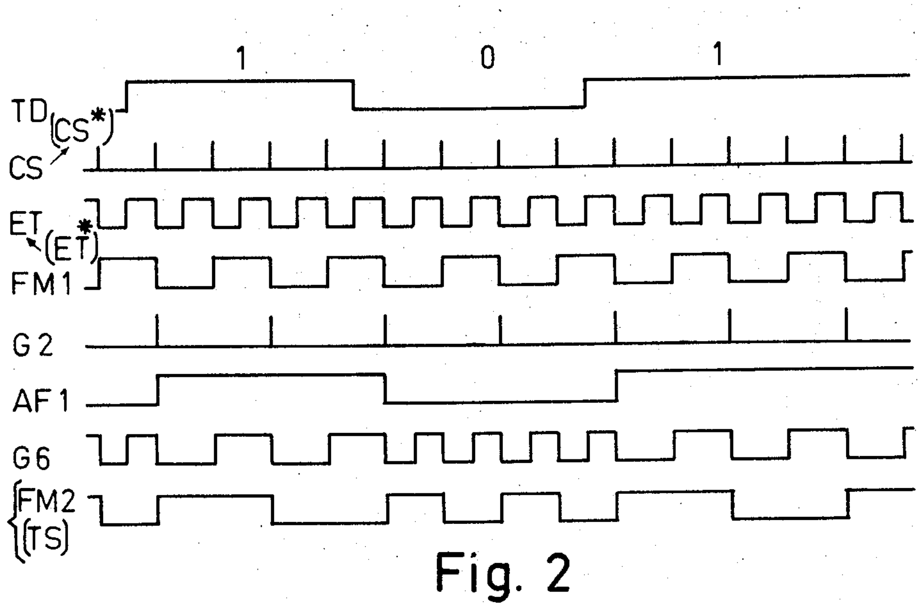

FIG. 1 shows the block diagram of the FM modulator; FIG. 2 shows the associated pulse diagrams. Basic signals for generating a Frequency-Shift-Keying signal are the clock pulse signals CS and CS* as well as ET and ET*, all four of them have the same frequency $f_2$. The following relationship exists between $f_s$ and the maximum transmission speed $vu_{max}$: $f_s$ (Hz) = 2 $vu_{max}$ (bit/s). The signal shapes of CS (CS*) and ET (ET*) may be seen from the pulse diagrams of FIG. 2. The signals CS (CS*) and ET (ET*) are generated in dependence on the construction of the modem in different frequency dividers ZG, FFA, FFB or FFC (see FIG. 11, FIG. 12, FIG. 14 and FIG. 15) as will be described hereinafter. For reliable operation of the modulator it is important that the signals CS and CS* as well as ET and ET* are synchronous with the modulating data signals TD (data signals to be transmitted). To this end the data signals TD to be transmitted are sampled by the pulse series from a gate G2, which pulse series has half the frequency of the clock pulse signal CS or CS* and are temporarily stored in a buffer flipflop consisting of a flipflop AF1 and gate G1. As is apparent from FIG. 2, the transitions of the data signal TD at the output of the buffer flipflop AF1 coincide with the pulses of clock pulse signal CS and CS* so that a rigid phase coupling is ensured. The signal FM1 is obtained by frequency division of the clock pulse signal CS or CS* by a factor of 2 in the correspondingly denoted binary divider stage FM1. The synchronized data signal at the outputs of buffer flipflop AF1, indicated by AF1 and $\overline{\text{AF1}}$, provides a balanced drive signal for a frequency modulator circuit formed by gates G4, G5 and G6 (all gates are NAND-circuits) while the output of the modulator circuit is connected to a binary divider stage FM2. At the binary value "1" of the data signal TD the buffer flipflop AF1 opens gate G4 for the frequency $2f_2$ ($f_2$ is the low characteristic frequency in this case). The inverted data signal $\overline{\text{AF1}}$ then closes gate G5 for the frequency $2f_1 = f_s$ ($f_1$ is the high characteristic frequency in this case). The frequency $2f_2$ or $2f_1$ passed at a given instant is applied through the outputs of the gates G4 and G5 connected so as to form a "wired AND" and through the inverter G6 to the state inputs of a JK-flipflop acting as divider stage FM2 at whose output the modulated data signal TS appears (see FIG. 2).

Figure 13:
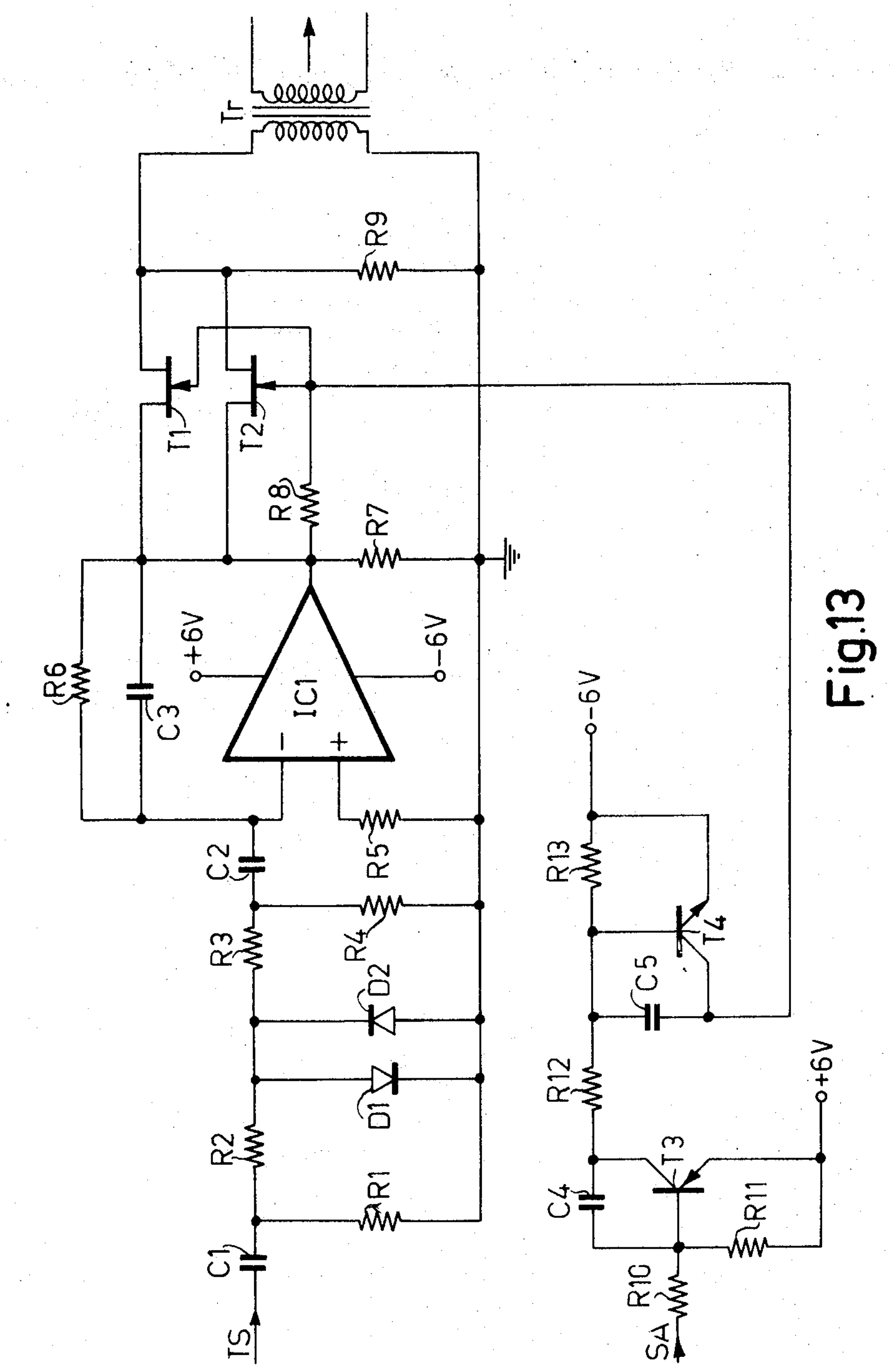
FIG. 13 shows a circuit diagram of the coupling stage for the transmitter section of the modem according to the invention.

The structure of the coupling stage which is located in the transmitter section between the digital modulator (FIG. 1) and the transmission line is shown in FIG. 13. The digitally modulated data signal TS (FM2 in FIG. 2) is passed through a diode limiter consisting of R2, D1 and D2 and through a potential divider R3, R4 and appears at the inverting input of an operational amplifier IC1 provided with a RC-network $R_6$, $C_3$ in its feedback circuit and operating as an active lowpass filter. The lowpass filter removes the unwanted harmonics from the digitally modulated data signal TS. The characteristic feature of the coupling stage is the electronic switch which is realized by the parallel arrangement of two field effect power transistors T1 and T2 and a command circuit for controlling the field effect transistors. The latter circuit is constituted by circuit elements T3, T4, R10 to R13 and C4 and C5. The electronic switch is controlled by a command signal SA (transmitter section to be switched on) from the data-processing arrangement connected to the modem. In the state "1" of the command signal SA the output of the amplifier is connected to the line transformer Tr through the low resistance value of the fully conducting field effect transistors so that, seen from the transmission line, the transmitter section appears with the low impedance of the transmitter amplifier. The transmitter amplifier is separated from the line by the cut-off field effect transistors when the command signal SA is in its "0" state and then, the transmission line is substantially only loaded with the input impedance of the transformer is no load condition. This property of the transmitter section is important for the structure of the "multipoint" transmission networks in which the receiver sections of the modems of the data terminals are connected through one and the same 2-wire line to the transmitter section of the modem of a computer and the tranmitter sections of the modems in the data terminals are connected through a separate 2-wire line to the receiver section of the computer modem.

Since in the operative condition of the modem in the data terminals coupled to the transmission line the output impedance of the modem is low, all other data terminals connected to the same transmission line must bring their modem transmitter sections into the high resistance condition so as to prevent an inadmissible high attenuation of the transmitted signal.

For demodulation the modulated data signal is passed through the transmission line to an input stage (not shown in FIG. 3) of the receiver section where the received data signal RS is regenerated as regards amplitude by means of limiter stages. A synchronous clock pulse signal is required for correct regeneration as regards time and for the subsequent demodulation of the received data signal RS. This clock pulse signal CS is derived in a purely digitally operating frequency divider FFA from the signal of the main generator (having, for example, a frequency $f_o = 614.4$ kHz which is quartz-stabilised) and, as regards phase, thic clock pulse signal CS is synchronized with the zero crossings of the received modulated data signal RS. The regenerated received data signal RS is passed to the demodulator where it is sampled with the aid of the synchronous clock pulse signal CS (at a frequency $f_s$ of, for example, 19.2 kHz) and is temporarily stored in a buffer flipflop AF2. The output signal of buffer flipflop AF2 is delayed over two clock periods $2Ts = 2/f_s$ by means of a subsequent shift register consisting of two stages SF1 and SF2. By logical processing of the signals AF2 and SF1 in an EXCLUSIVE-OR circuit consisting of gates G8, G9, G10 the original transmitted data signal TD is recovered at the output of flipflop AF3 as signal ED. The variation with time of the different signals upon recovery of the original data signal is shown in FIG. 4. The separate signals RS, CS, AF2, SF1, G10, AF3 (signal ED in FIGS. 5, 12, 14 and 15) are present at the outputs of the correspondingly denoted circuit elements in the embodiments according to FIG. 3 and FIG. 5, FIG. 12, FIG. 14 and FIG. 15, respectively.

The demodulated data signal is sampled in the rhythm of the data receiver clock pulse signal RST in accordance with the bit transmission speed by means of a clock pulse signal present at the output of a gate G40 and is temporarily stored in flipflop AF3 for the duration of one bit interval. The clock pulse signal G40 is obtained from the synchronous clock pulse signal CS for the coherent demodulation by means of a clock frequency divider EFA (FIG. 5) which is stepwise adjustable through switches or connection strips L1, L2, L3 and L4 connected to the stages EAS to EES. The division ratio of clock frequency divider EFA is to be chosen in accordance with the transmission speed of that instant. (At, for example, $v\ddot{u} = 9,600$ bits/s the division ratio is 2 : 1 and the connection strip $L_1$ is provided between gate G39 and stage EAS).

As described a synchronous clock pulse signal CS of frequency $f_s$ (for example, 19.2 kHz) is required for the coherent demodulation of the regenerated received data signals. The synchronization of the clock pulse signal CS controlling the demodulator with the zero crossings of the received data signal RS is effected in a digitally operating synchronizing circuit which comprises the following essential components: a divider which is variable in its division ratio (frequency divider FFA), a signal transition detector FLD for the detection of the zero crossings and a phase corrector PK for obtaining a control signal which is a measure of the phase difference between the received data signal RS and the clock pulse signal CS derived by means of the variable divider from the frequency i $f_o$ (for example, $f_o = 614.4$ kHz of the main generator. The signal transition detector FLD and the phase corrector PK together constitute the phase detector PHD. To correct the phase of the clock pulse signal CS correction steps are introduced which counteract the initial phase difference obtained by phase comparison in phase corrector PK. The correction step is $1/\mu$ts ($ts = 1/f_s$) per period of the clock pulse signal CS. Since in the most unfavorable case the clock pulse signal CS may be 50 percent out of phase relative to the received data signal RS, assuming that this received data signal is undistorted, $\mu/2$ correction steps are required for acquiring initial synchronisation, that is to say, $\mu/2$ transitions of the received data signal RS until the synchronous condition is achieved. As $\mu$ is larger, the initial synchronization will last longer, manely $\mu/2$ ts when receiving the high characteristic frequency $f_1$ and $\mu$ts when receiving the low characteristic frequency $f_2$. It is desirable to keep the period for acquiring initial synchronization as short as possible. This means that a small value must be chosen for $\mu$ and consequently, correction steps must be introduced that are large relative to the clock period *ts*. This gives rise to an unfavorable behavior of the synchronizing circuit once initial synchronization is achieved, when, for example, only small frequency deviations between the oscillators of the remote transmitter and the receiver are to be compensated for. Interferences in the transmission path cause "false" zero crossings in the received signal which are located outside the time raster characterized by the clock pulse signal so that the synchronization of this clock pulse signal may be disturbed and this at a quicker rate as the correction steps are larger. One possible way to satisfy these contradictory requirements for the synchronizing circuit is to perform the synchronizing process in two phases. During initial synchronization large correction steps are introduced or in the extreme case bringing in phase is effected in one step; steady-state synchronization is effected while using very small correction steps so that the risk of losing synchronism in case of a received signal affected by interference is greatly reduced (flywheel effect). A further solution makes no distinction between initial and steady-state synchronization. The choice of the magnitude of the correction step is a compromise between the two contradictory requirements. This solution is chosen in thise case. The correction step is chosen to be equal to, for example one thirty-second part of the clock period ts, that is to say, $\mu = 32$ so that a satisfactory compromise is obtained between the two requirements. By this choice of $\mu$, the relationship between the frequency $f_o$ of main generator HG and the frequency $f_s$ of the synchronous clock pulse signal CS is determined: $f_o = \mu f_s$, for example, for $f_s = 19.2$ kHz and $\mu = 32$ it follows that $f_o = 32 \times 19.2$ kHz $= 614.4$ kHz.

Figure 5:
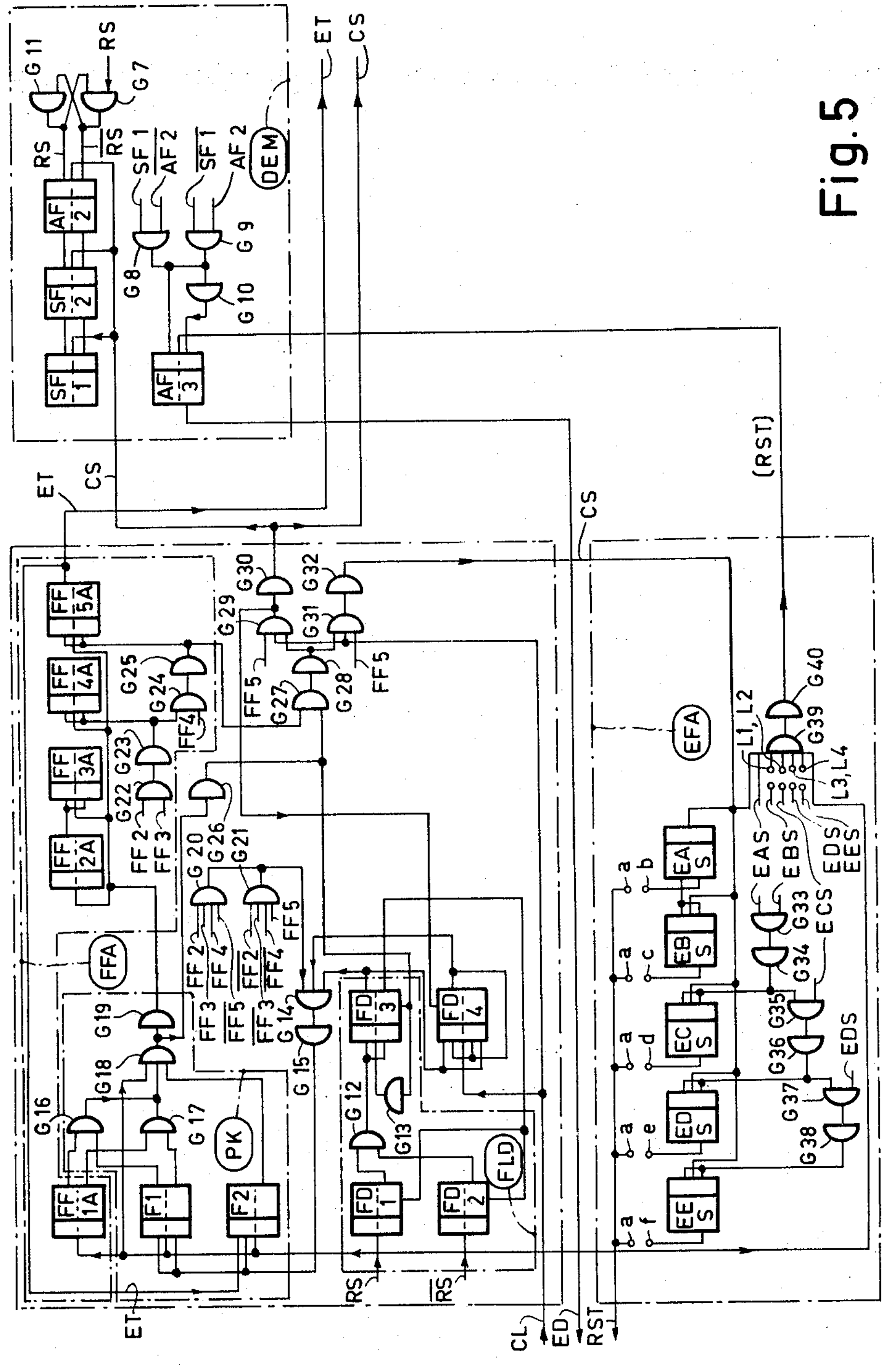

FIG. 5 shows the circuit arrangement of the receiver including the demodulator DEM (top right), the clock frequency divider EFA for generating the data receiver clock pulse signal (bottom left) and the synchronizing circuit (top left) consisting of the frequency divider FFA and the phase detector. Flipflops FD1, FD2 and FD3 and gates G12 and G13 constitute the signal transition detector FLD. Each transition of the regenerated received data signal RS causes one of the two flipflops FD1 and FD2 to change over and thus prepares, through gate G12, flipflop FD3 for a change-over at the next clock pulse which is applied from gate G26 through gate G13. The latter clock pulses occur at a frequency which is equal to half the main generator frequency (in this case, for example, $f_o/2 = 307.2$ kHz).

Figure 6:
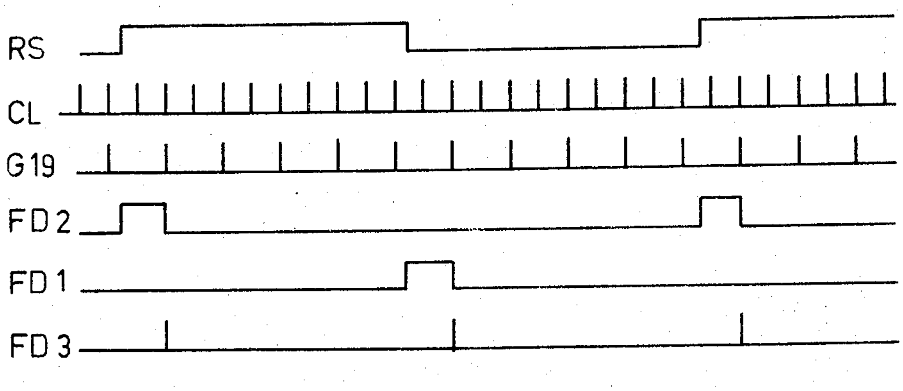
FIG. 6 shows the pulse diagrams for the signal transition detector shown in FIG. 5 an FIGS. 7 and 8 show the pulse diagrams for the phase corrector shown in FIG. 5.
Figure 7:
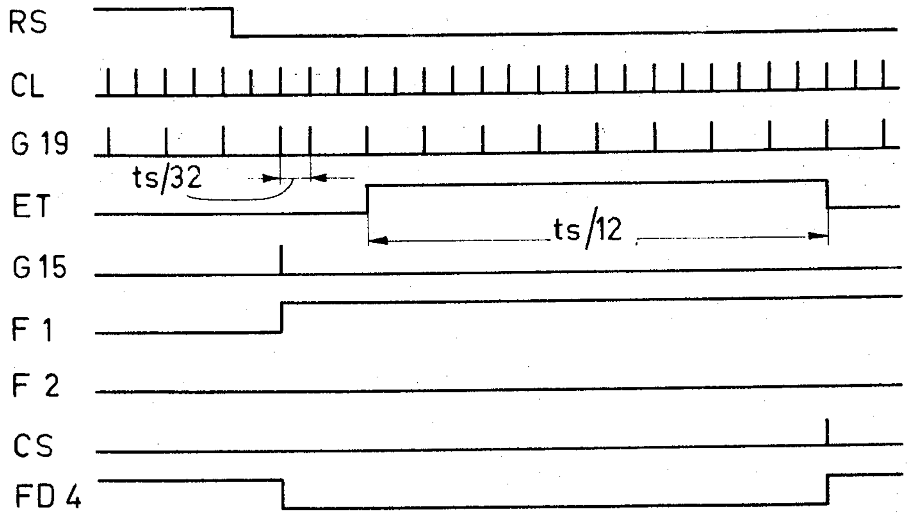
Figure 8:
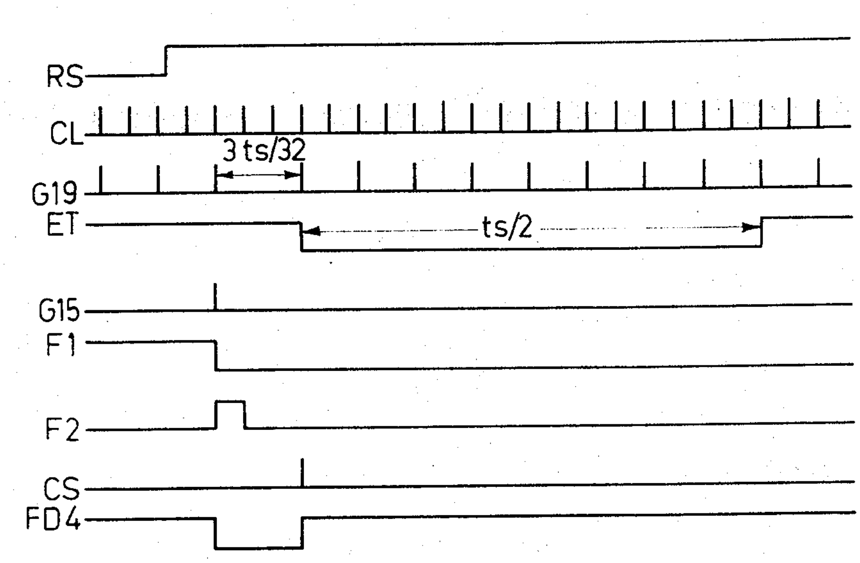

Flipflop FD3 is reset again with the trailing edge of the clock pulse. Thus, at each transition of the received data signal RS a pulse is produced, which falls within the time raster given by the main generator clock pulse signal CL (see FIG. 6). Flipflop FD1 and FD2 are reset to their initial states by reset inputs occurring at each output pulse of the signal transition detector (FD3). Simultaneously a flipflop FD4 is prepared which falls into its rest state or "0" state at the next clock pulse of the main generator clock pulse signal CL and blocks a gate G14. Flipflop FD4 is periodically set in its "1" state by means of the inverted clock pulse signal through gate G29 so that the signal transition-detector is again activated. In this manner the possibility that during the interval given by the clock period ts of the clock pulse signal more than one correction step can be performed is eliminated. The pulses from the signal transition detector that are admitted for phase correction, are applied through gates G14 and G15 to the state inputs of flipflops F1 and F2. Flipflops F1 and F2 and gates G16, G17, G18 and G19 constitute the phase corrector PK of the synchronizing circuit. Flipflops $FF_1A$ to $FF_5A$ and gates G22, G23, G24 and G25 constitute the binary frequency divider FFA having a nominal division ratio 1 : 32, its cycle time ts can be made longer or shorter to the amount of $ts/32$ by varying the division ratio under the control of the phase corrector PK, dependent on the binary value of the output signal ET of frequency divider FFA at the instant of a correction pulse or transition of the received date signal RS. When, for example, a correction pulse of transition detector FLD occurs while the output signal ET of frequency divider FFA is equal to "0," flipflop F2 cannot change over at the next clock pulse CL. Flipflop F1 changes its state and inverts the phase of the clock pulse signal CL for the portion of the binary frequency divider FFA consisting of the stages $FF_2A$ to $FF_5A$ so that the divider cycle is shortened. This is shown in the time diagrams of FIG. 7. A longer cycle is obtained when the divider stage $FF_5A$ is in its "1" state (ET = "1") at the instant a correction pulse occurs (see FIG. 8). In that case flipflop F2 occupies its changed state for the duration of a period of the clock pulse signal CL and blocks gate G18.

Figure 9:
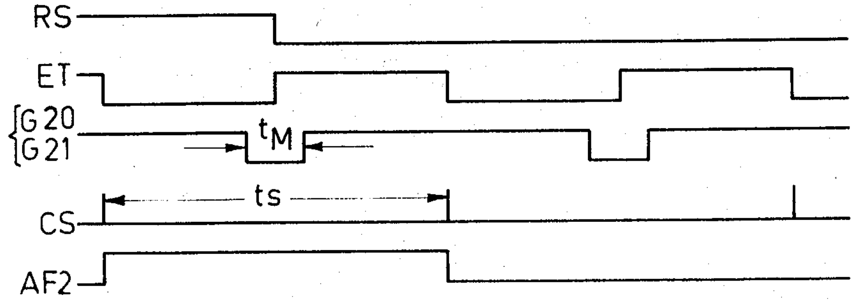
FIG. 9 shows the time diagram in which the mutual time position of the received data signal and the synchronous clock pulse signal is shown.

After initial synchronization has taken place, the received data signal RS has a time position relative to the clock pulse signal CS at the output of gate G30 as shown in the time diagram of FIG. 9. In the synchronized state of the synchronizing circuit the pulses of the synchronous clock pulse signal CS used for sampling of the received data signal RS occur in the middle of half a period of the received data signal RS upon reception of the high characteristic frequency $f_1$ while two sampling pulses occur during each half period upon reception of the low characteristic frequency $f_2$. For both cases the clearance, that is to say the time distance between the sampling pulse and the transitions of the received signal is $s/2$ when receiving an undistorted signal. The signal at the common output of gates G20 and G21 blocks gate G14 during the period $t_M$ which is symmtrical relative to the "0" "1" transition of the signal ET so that the transitions of the received data signal RS which occur during this period cannot change the phase of the synchronous clock pulse signal CS. This leads to a reduction of phase jitter in the synchronized condition. Only the natural frequency deviations of the main generators in the transmitter and the receiver are compensated for.

Figure 3:
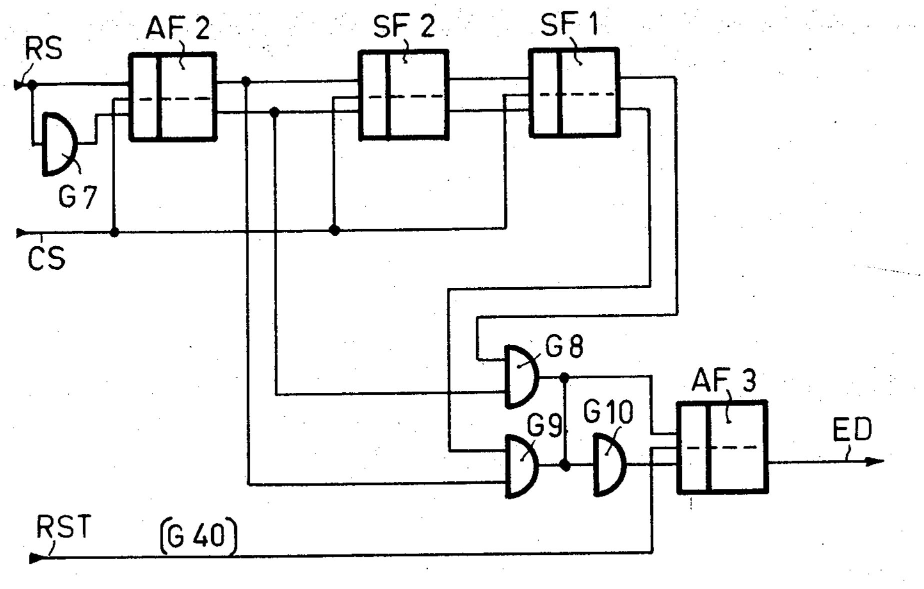
Figure 4:
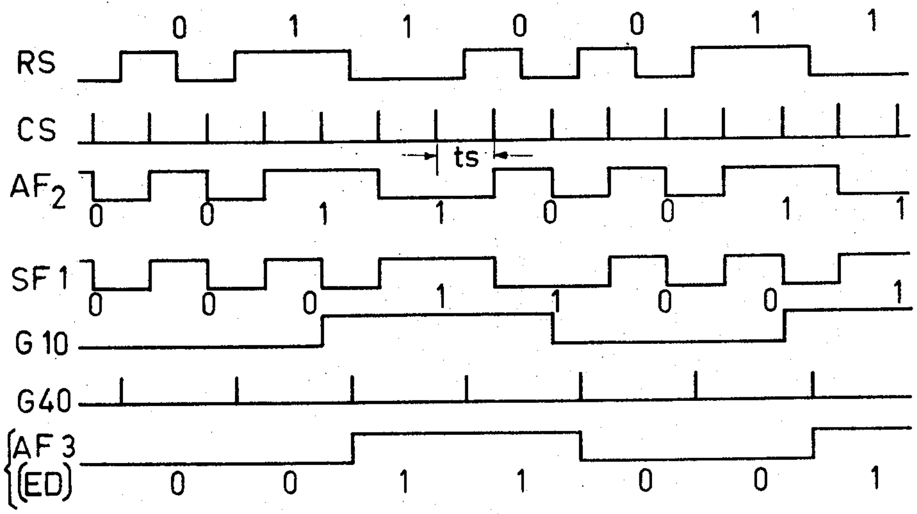
FIG. 4 shows the associated pulse diagrams.
Figure 10:
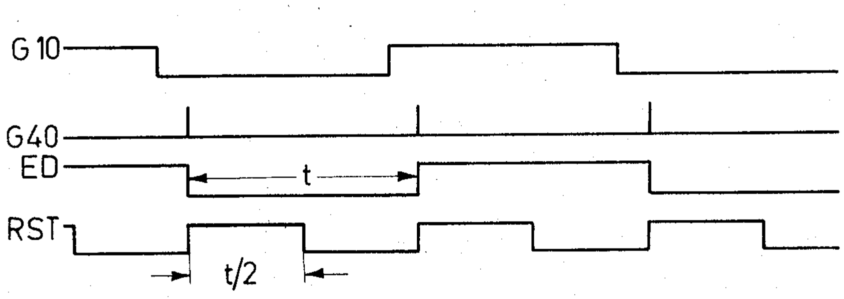
FIG. 10 shows the time diagram in which the mutual time position of the demodulated data signal, the received data signal and the data receiver clock pulse signal is shown.

Demodulation of the received data signal RS is effected, as described, in the circuit arrangement composed of the JK-flipflops AF2, SF1 and SF2 and the gates G8, G9 and G10 (FIGS. 3 and 5). The demodulated data signal is present at the output of the gate G10, which data signal is periodically sampled in the rhythm of the data receiver clock pulse signal RST at the output of gate G40 and is stored for the duration of one bit interval in JK-flipflop AF3. The data receiver clock pulse signal RST is produced in the binary frequency divider EFA consisting of the stages EAS to EES where it is derived from the synchronous clock pulse signal CS required for demodulation. The clock pulse signal CS occurs at the output of gate G32. The clock pulses (output of gate G40) required for regeneration (as regards instant of occurrence) of the demodulated received data signal in buffer flipflop AF3 are coded in gate G39. The pulse repetition frequency is adjustable by means of connection strips $L_1$, $L_2$, $L_3$, $L_4$ in the data receiver clock pulse generator EFA. The pulse repetition frequency corresponds with the frequency of the data receiver clock pulse signal RST at the transmission speed chosen. Associated with the "0" "1" transitions of the data receiver clock pulse signal RST is the active edge of a sampling pulse at the clock pulse input of buffer flipflop AF3 so that the "1" "0" transitions of the data receiver clock pulse signal RST characterize the middle of the time interval of a signal element ED of the received data signal at the output of buffer flipflop AF3 (FIG. 10).

In the first method of using the modem (see FIG. 12) the identical data transmitter clock pulse signal TST and data receiver clock pulse signals RST are obtained by means of the same clock frequency divider EFA.

Figure 11:
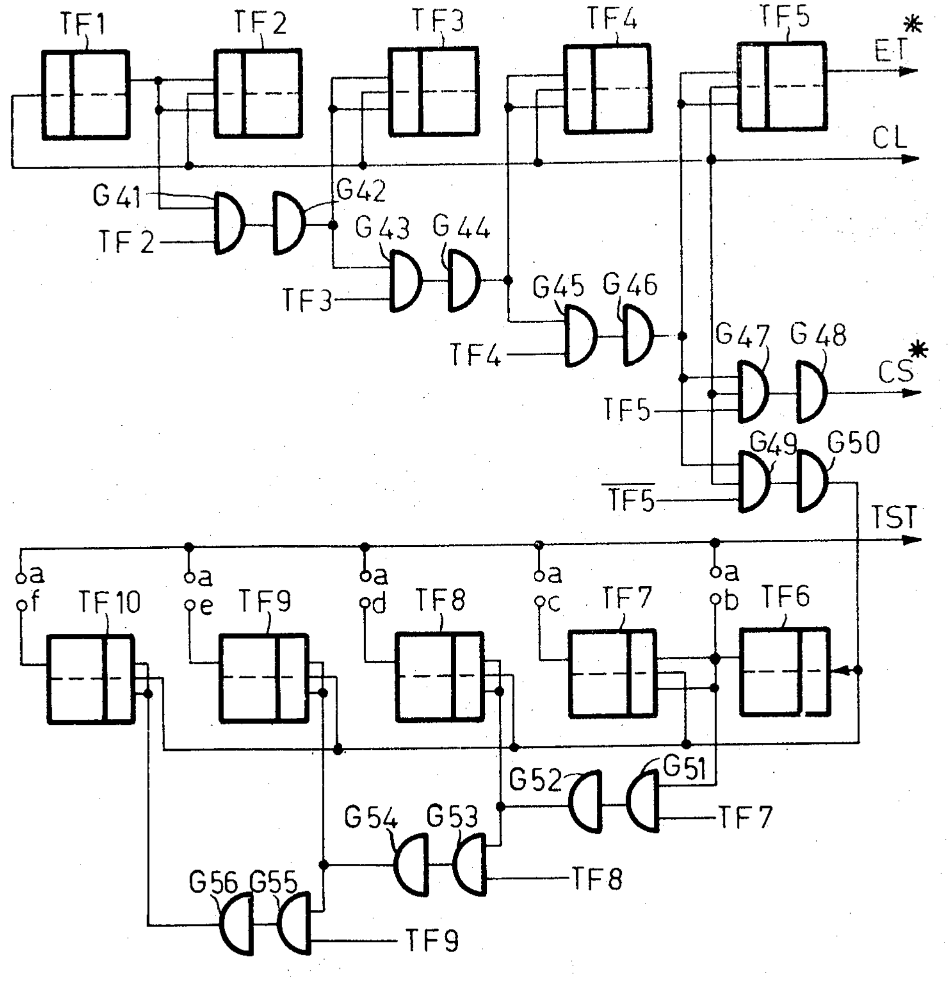
FIG. 11 shows an embodiment of the clock frequency divider for generating the clock pulses for the modulators in the third method of application of the modem according to the invention.
Figure 12:
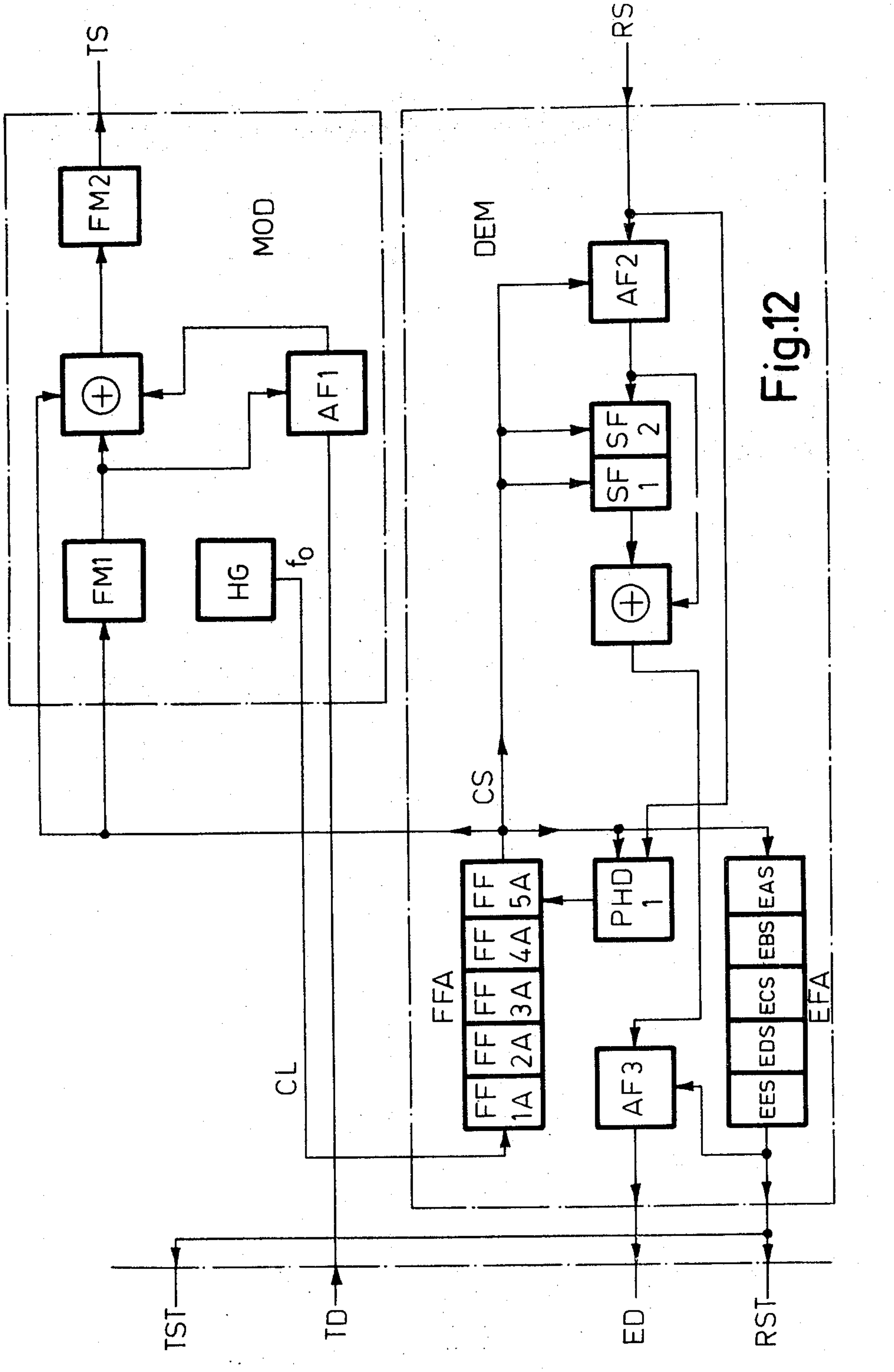
FIG. 12 is a block diagram of the modem according to the invention for a first method of application.

The second frequency divider FFB with the associated second phase detector PHD2 for the second method (compare FIG. 14), and the additional fixed frequency divider with the associated adjustable clock frequency divider (whose joint structure is shown in FIG. 11) for the third method (compare FIG. 15) may be omitted for this first method. The control of the modulator MOD is taken over in this case by frequency divider FFA with the associated phase detector PHD1 which already ensure the control of demodulator DEM.

Figure 14:
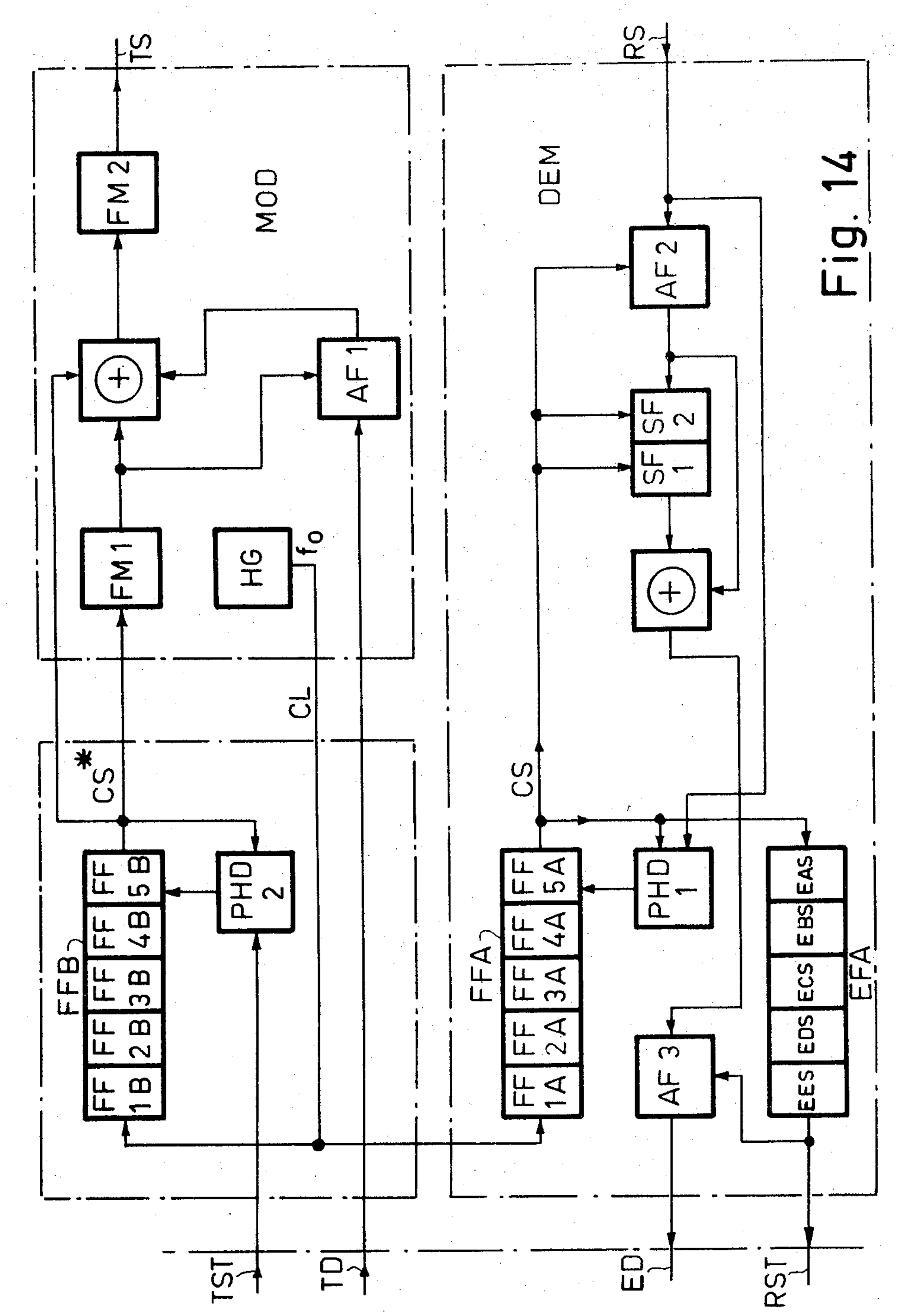
FIG. 14 is a block diagram of the modem according to the invention for a second method of application.
Figure 15:
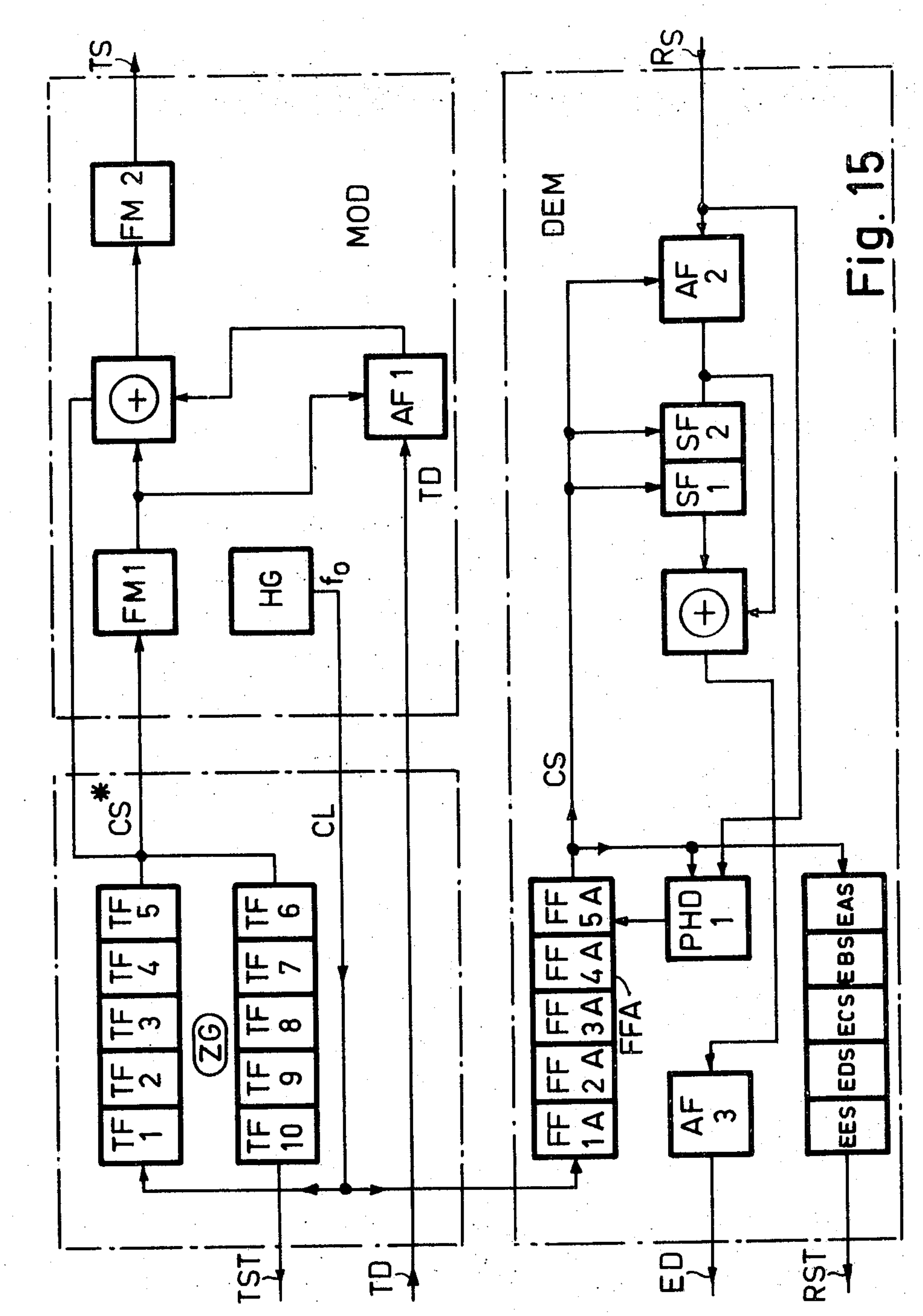
FIG. 15 shows a block diagram of the modem according to the invention for a third method of application.

When externally applying the data transmitter clock pulse signal in accordance with the second method of using the modem, the data signal TD and associated data transmitter clock pulse signal TST are applied to the modulator by the data-processing arrangement connected to the modem (FIG. 14). Since the characteristic frequencies $f_1$ and $f_2$ for the frequency modulator circuit are derived from the frequency $f_o$ of main generator HG in the modem, it is necessary in this case to synchronized the clock pulse signal CS* required for modulation and having a frequency of, for example, $f_o$ = 19.2 kHz with the externally applied data transmitter clock pulse signal TST. As regards structure, the synchronizing circuit additionally required for this purpose and consisting of a second frequency divider FFB and an associated phase detector PHD2 is identical to the synchronizing circuit for generating the clock pulse signal CS used for the coherent demodulation. This latter circuit has alreay been described with reference to FIGS. 5 and 12. Instead of the received data signal RS the data transmitter clock pulse signal TST is applied to the signal transition detector FLD of phase detector PHD2.

When the data transmitter clock pulse signal TST is internally generated in accordance with the third method of using the modem (see FIG. 15), the modem operates with data transmitter clock pulse signals and data receiver clock pulse signals which are independent of each other. Unlike the second method, the data transmitter clock pulse signal TST is internally generated in this case by means of an additional fixed frequency divider and an adjustable clock frequency divider connected thereto which together constitute a clock pulse generator ZG. This clock pulse generator ZG, shown in FIG. 11, consists of the fixed binary frequency divider TF1-TF5 for deriving clock pulse signal CS* and ET* from the frequency $f_0$ of main generator HG for the modulator and of a second binary clock frequency divider TF6-TF10 which produces the data transmitter clock pulse signal TST. The data signals TD to be transmitted are called up from the data-processing arrangement by means of the data transmitter clock pulse signal TST. The frequency of the data transmitter clock pulse signal TST may be adjusted stepwise by means of connection strips between the connection points *a*, *b*, . . . ., *e*, f in accordance with the desired transmission speed (see FIG. 11).

What is claimed is:

1. A digital synchronous modem for the synchronous FM transmission of binary coded data signals through cables and internal telephone lines, comprising a transmitter section; and a receiver section; the transmitter section comprising a modulator for transmitting the binary coded data signals, a main generator for generating a fundamental frequency, a stepwise controlled frequency divider connected to the main generator for providing clock pulses, means connecting the output of the stepwise controlled frequency divider to the modulator as a control signal, the modulator comprising interconnected logic gates and bistable triggers; the receiver section comprising a demodulator for receiving the binary coded data signals, means connecting the output of the stepwise controlled frequency divider to the demodulator as a control signal, the demodulator comprising interconnected logic gates and bistable triggers, a phase detector connected to the received data signals and to the output of the stepwise controlled frequency divider for comparing the zero crossings of the received data signals with the clock pulses and for providing a phase control signal, means for applying the phase control signal to the stepwise controlled frequency divider for synchronizing the clock pulses with the received data signals, a stepwise adjustable clock frequency divider connected to the output of the stepwise controlled frequency divider for providing a data receiver clock pulse signal having a selectable frequency, and means connecting the data receiver clock pulse signal to the demodulator as a data transmission speed control signal.

2. A digital synchronous modem as claimed in claim 1, wherein the transmitter section further comprises a second stepwise controlled frequency divider connected to the main generator for generating clock pulses controlling the modulator, a second phase detector, means for applying the clock pulses from the second stepwise controlled frequency divider and an external data transmitter clock pulse signal to the second phase detector, said second phase detector applying a control signal to the second stepwise controlled frequency divider for synchronizing the clock pulses for the modulator with said external data transmitter clock pulse signal.

3. A digital synchronous modem as claimed in claim 1, wherein the transmitter section further comprises an additional fixed frequency divider connected to the main generator for generating clock pulses controlling the modulator, and a stepwise adjustable clock frequency divider connected to the additional fixed frequency divider for providing a data transmitter clock pulse signal corresponding to the desired data transmission speed independent of said data receiver clock pulse signal.

4. A digital synchronous modem as claimed in claim 1, wherein the data receiver clock pulse signal provided by the first stepwise adjustable clock frequency divider is also applied as a control signal to the demodulator.

5. A digital synchronous modem as claimed in claim 1, the phase detector comprises a signal transition detector which is composed of bistable triggers and logical gates, and a phase corrector which is connected to the signal transition detector and is likewise composed of bistable triggers and logical gates, said phase corrector also being connected to the output of the stepwise controlled frequency divider.

6. A digital synchronous modem as claimed in claim 3, wherein the additional fixed frequency divider and the stepwise adjustable clock frequency divider connected thereto are composed of bistable triggers interconnected through logical gates.

7. A digital synchronous modem as claimed in claim 1, wherein the modulator comprises a bistable buffer trigger, a time control circuit provided with a logical gate for controlling the bistable buffer trigger, means for applying the clock pulses for the modulator directly to the logic gate of the time control circuit, a bistable trigger acting as a two-to-one divider receiving the clock pulses for the modulator and applying the divided clock pulses to the logic gate of the time control circuit, a frequency modulator circuit in the form of logical gates connected to the outputs of the buffer trigger, means applying two carrier pulse signals derived from the clock pulses to the frequency modulator circuit, and a bistable trigger acting as a two-to-one divider connected to the output of the modulator circuit.

8. A digital synchronous modem as claimed in claim 1, wherein the demodulator comprises a bistable buffer trigger, a shift register connected thereto, both the buffer trigger and the shift register being controlled by the clock pulses, an EXCLUSIVE-OR circuit comprising logic gates connected to the outputs of the buffer trigger and the shift register, a bistable trigger controlled by the data receiver clock pulse signal being connected to the output of the EXCLUSIVE-OR circuit.

9. A digital synchronous modem as claimed in claim 1, further comprising a coupling stage connecting the modulator in the transmitter section to the cable, the coupling stage comprising an active lowpass filter, limiting elements shunting the input of the lowpass filter, an output transformer a switching transistor connecting the output of the lowpass filter to the output transformer, and a command signal stage operating the switching transmitter.

* * * * *